United States Patent [19]
Parkinson et al.

[11] 3,976,979
[45] Aug. 24, 1976

[54] COUPLER FOR PROVIDING DATA TRANSFER BETWEEN HOST AND REMOTE DATA PROCESSING UNITS

[75] Inventors: Kelvin L. Parkinson, Bolton; Joseph M. Austin, Shrewsbury, both of Mass.

[73] Assignee: Honeywell Information Systems, Inc., Waltham, Mass.

[22] Filed: Jan. 2, 1974

[21] Appl. No.: 430,110

[52] U.S. Cl. ............................................. 340/172.5
[51] Int. Cl.² .................. G06F 15/16; G06F 15/20
[58] Field of Search ...................... 340/172.5; 445/1

[56] References Cited
UNITED STATES PATENTS

| | | | |
|---|---|---|---|
| 3,380,030 | 4/1968 | Mc Mahon | 340/172.5 |
| 3,461,432 | 8/1969 | Keiter et al. | 340/172.5 |
| 3,462,741 | 8/1969 | Bush et al. | 340/172.5 |
| 3,500,466 | 3/1970 | Carleton | 340/172.5 |
| 3,541,517 | 11/1970 | Belt et al. | 340/172.5 |
| 3,564,506 | 2/1971 | Bee et al. | 340/172.5 |
| 3,631,405 | 12/1971 | Hoff et al. | 340/172.5 |
| 3,638,195 | 1/1972 | Brender et al. | 340/172.5 |
| 3,721,961 | 3/1973 | Edstrom et al. | 340/172.5 |

*Primary Examiner*—Harvey E. Springborn
*Attorney, Agent, or Firm*—John S. Solakian; Ronald T. Reiling

[57] ABSTRACT

A system for providing bidirectional data transfer between a host data processor and a remote data processor including coupler means responsive to the host processor for forcing the remote processor to provide such bidirectional data transfer even though the remote processor system software has failed and is unusable and/or even though the remote processor may be in a stopped state. Means are also provided for handling different word sizes which are normally processed in the respective processors, in order to properly interface such processors.

7 Claims, 7 Drawing Figures

COUPLER FOR PROVIDING DATA TRANSFER BETWEEN HOST AND REMOTE DATA PROCESSING UNITS

BACKGROUND OF THE INVENTION

The present invention relates to communications devices and more particularly to a coupler or interface unit for providing bidirectional data transfer between a host and a remote processor.

During normal communications between a host and a remote processor, the various data transfers necessary in both directions are effected by means of normal handshaking signals which couple the remote and host processors so as to provide such communication. However, there are conditions wherein the remote processor may have been disabled and accordingly the host is not able to communicate with the remote processor. In certain situations, such a condition may be catastrophic and is accordingly undesirable. For example the remote processor may have had a system software failure or for some other reason may to a certain extent be unusable. In addition, the remote processor may have been stopped and may have to be restarted from a remote location such as the host processor. Accordingly, it is desirable to include means in the system, responsive to the host processor, for enabling data transfer in either direction. This requirement for providing such communication in spite of such possible failures is additionally complicated where word lengths normally processed by the host processor and the remote processor are different.

It is accordingly an object of the invention to provide improved means for providing bidirectional communications between a host and a remote processor particularly where the remote processor may to a certain extent be disabled and is unable to provide the normal signals to effectuate such transfer.

It is a further object of the invention to provide a capability of enabling such bidirectional data transfer while handling different size words that are normally processed in the respective processors.

SUMMARY OF THE INVENTION

These and other objects of the present invention are realized by providing a system comprising a coupler for interfacing a host processor and a remote processor for bidirectional data transfer wherein the coupler comprises apparatus for detecting a data transfer command for such bidirectional transfer between the processors, an input register, and output register, and apparatus responsive to the detection of such data transfer command for enabling the host processor to load data into the input register or for enabling the remote processor for loading data into the output register. Apparatus is also provided for transferring such data from either the input register or the output register to respectively the remote processor or the host processor. The apparatus of the present invention further comprises apparatus coupled with said input register and the output register for providing the conversion between the character or word size utilized in the host processor and the character or word size used in the remote processor. The system is further characterized by providing in the coupler, apparatus for enabling the remote processor to transfer data with the host processor even though the remote processor is presently subject to a system software failure or is presently in a stopped state. More specifically, in addition to the apparatus provided in the coupler of the invention, also included in the remote processor is a protected program in the remote processor's memory for enabling such data transfer even though the normal system software of the remote processor is unable to provide for its normal data transfer.

BRIEF DESCRIPTION OF THE DRAWINGS

A complete understanding of the invention and the above and other advantages thereof may be gained from a consideration of the following detailed description of an illustrative showing thereof presented hereinbelow in connection with the accompanying drawings in which.

DETAILED DESCRIPTION OF THE PREFERRED EMBODIMENTS

Figure 1:
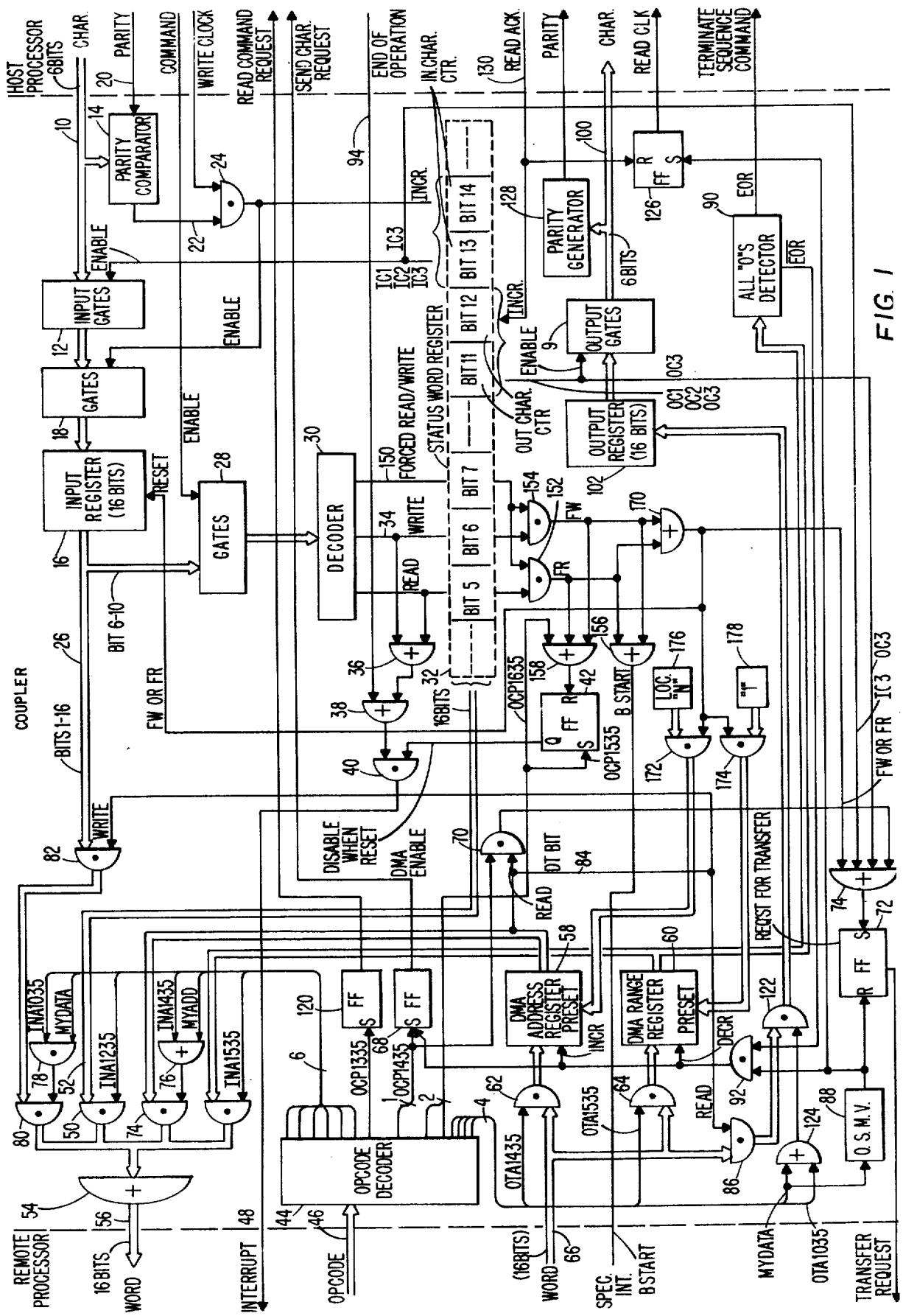
FIG. 1 is a logic diagram of the coupler of the present invention.

The coupler of the present invention is coupled between a host and a remote processor for bidirectional transfer of data as shall be specifically described with respect to the logic diagram of FIG. 1. The host processor generally provides control over the total system which includes at least one processor as the remote processor. Before such detailed discussion, certain specifications and operational characteristics of the system of the present invention shall be presently described. The host processor is capable of generating in addition to other signals, a write command, a read command, and in addition, a forced write or forced read command. The remote processor operates to issue operation code (opcode) commands or instructions. In response to the write command, data is transferred from the host processor to the remote processor. In response to the read command, data is transferred from the remote processor to the host processor. Similarly, for the forced write and read operations, data is transferred in the same respective directions except that during such forced write or read operations, the system is enabled for data transfer independent of the functioning of the remote processor; that is, even though the remote processor system software may have failed or even though the remote processor may be in a stopped state.

In response to these commands from the host processor, the coupler is operative such that, the remote processor is enabled to issue further opcode commands which enable the coupler of the present invention to be enabled for these various transfers. Before discussing these opcode commands, the status word of the coupler of the present invention shall be discussed. The status word register 32 of the coupler of the present invention comprises by way of illustration sixteen bits, seven of which are of main interest here. Bits five, six and seven of the status word are enabled by means of the decoder 30 in response to the opcode or command received from the host processor. Bit five is set in response to the decoding of a read command, bit six is set in response to decoding of a write command, and bit seven is set in response to a forced read or write command. Bits eleven and twelve comprise an output character counter, and bits thirteen and fourteen of the status word register 32 comprise an input character counter. These counters are required in order to keep track of the various characters of different size words which are to be transferred between the host and remote processors. For example, as three characters of six bits in length are received from the host processor for transfer to the remote processor as a sixteen bit word, as shall be described hereinafter with respect to the input gating logic of FIG. 7, the input character counter of status word register 32 is incremented once each time such character is received from the host processor. When the input character counter has reached a count of three as indicated by the IC3 signal, the data transfer is put into effect so that data is transferred from the input register 16 to the remote processor, via bus 56. In a like manner, the output gates are also responsive to the output character counter in order to transfer the data from the output register to the host processor. The other bits of the status word register 32 are not essential to the present invention but in general, they describe the status of the coupler of the present invention, i.e., whether it is operational, busy, active, etc. Some of the other bits are used to indicate error conditions such as data parity error or transfer timing errors, etc.

Now with reference to the opcode commands generated by the remote processor for utilization by the coupler of the invention, such opcode commands are associated with data input transfer in response to a write command from the remote processor and are denoted by the opcodes symbols INA. A further generic command includes output data commands in response to a read operation command and are indicated by opcode symbols OTA. Yet a further generic command includes control enabling commands which are designated by the letters OCP. Each of these opcode commands designated by INA, OTA and OCP may be generated under program control in the remote processor. In addition, and transparent to the remote processor system software included in the remote processor, the remote processor is capable of generating a MYADD opcode command and a MYDATA opcode command. The MYADD opcode command enables the receipt of the address of the DMA address register 58 to which or from which data is to be transferred with the remote processor. The MYDATA opcode command enables the actual data to be transferred from or to the remote processor. Each of these opcode commands is detected by means of opcode detector 44 in response to an opcode command received on bus 46 from the remote processor.

More specifically, the INA 1235 opcode, the number 35 at the end of 1235 for this instruction as well as all other instructions or commands relating to the address of the coupler of the present invention, is a command to enable the status word included in register 32 to be sent to the remote processor. The INA 1435 command enables the contents of the DMA address register 58 to be sent to the remote processor and the INA 1535 command enables the contents of the DMA range register to be sent to the remote processor. The DMA designation relates to direct memory access which is available on many well known data processing equipment and need not presently be discussed. The address refers to the starting address at which the data is to be read from or written into the remote processor's memory and the DMA range register indicates the number of addresses or the total block in memory into which or from which data is to be written or read from. The OTA 1035 opcode command enables the data to be transferred from the remote processor to the coupler's output register 102 whereas the OTA 1435 and OTA 1535 opcode commands operate so as to load registers 58 and 60 in a similar manner as did the INA 1435 and 1535 commands enable the reading of information from such registers. The OCP 1335 opcode command is provided in order to generate a read command request to the host processor. The OCP 1435 opcode command is provided in order to enable the system for direct memory access operation. The OCP 1635 command disables normal interrupts on line 48 to the remote processor. The MYADD and MYDATA opcode commands function as hereinbefore recited.

Figure 2:
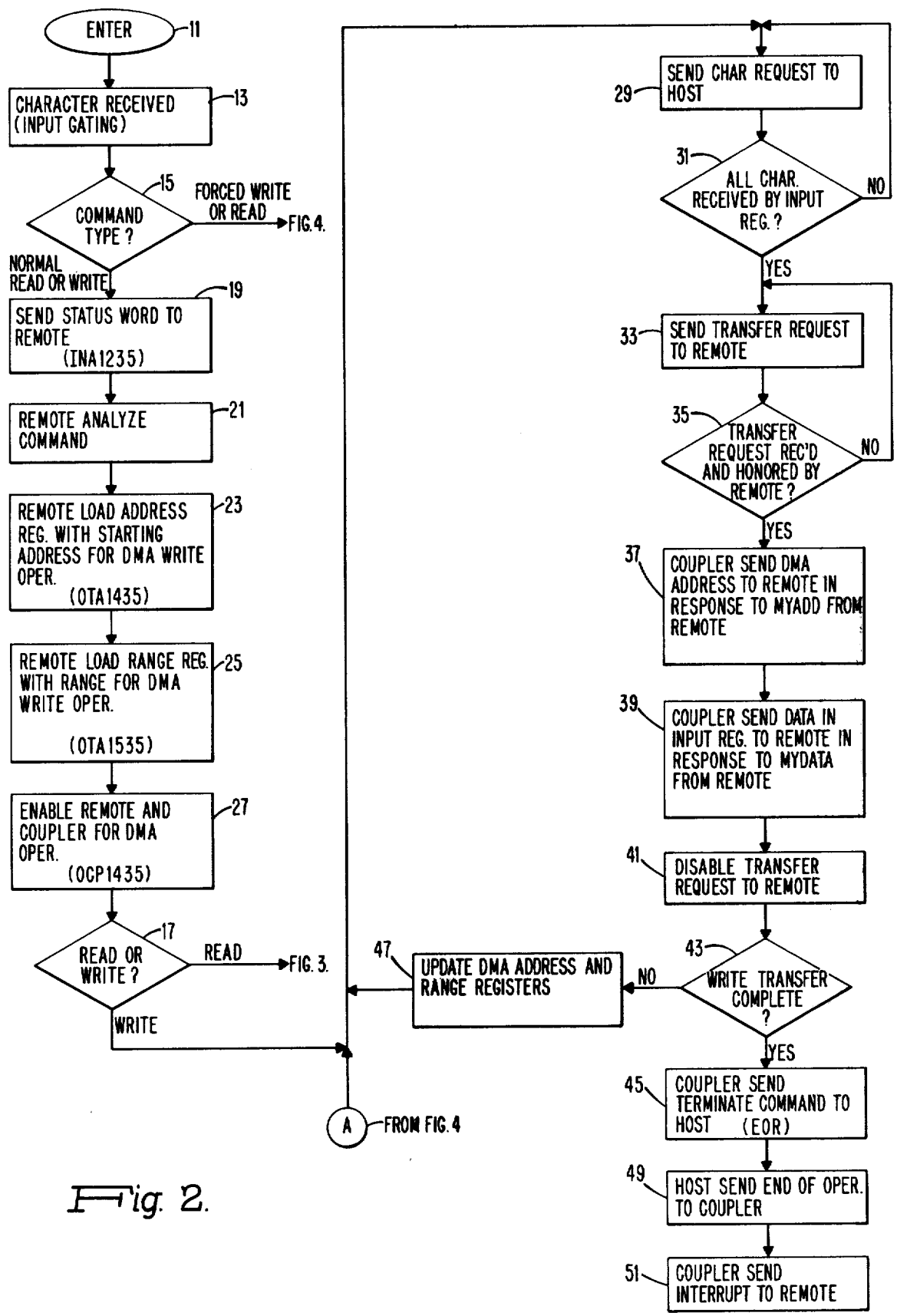
FIG. 2 is a flow diagram illustrating the normal write operation of the present invention.

Now with reference to FIG. 1 and FIG. 2, a normal write operation shall be described. One character or for example six bits of a word are received from the host processor over bus 10 and are received by input gates 12 to be hereinafter described and parity comparator 14. The input gates 12 are enabled so that the 6 bits received on bus 10 are loaded into the correct positions of input register 16 via gates 18. Parity comparator 14 compares the parity signal received from the host processor over line 20 with the bits on bus 10 and if correct, produces an enabling signal on line 22, to enable AND gate 24. The input gates are hereinafter described with reference to FIGS. 5 and 6. Before any information which is to be written into the remote processor in response to a write command is received from the host processor, the write command must be received from the host processor. The write command opcode will be included in bits six through ten of the bits coupled from the output of input register 16 on bus 26. The host processor also generates a signal when a command is being sent to the coupler of the invention. This enables bits six through ten from input register 16 to be gated through gates 28 to decoder 30. Decoder 30 is coupled to provide at least 3 bits of a 16 bit register called the status word register 32. These 3 bits are bits 5, 6 and 7 of such register 32, which are set to indicate a read operation, a write operation, or a forced read or write operation. The forced read or write operation shall be hereinafter described, as shall the read operation.

Thus, when the characters are received on bus 10 from the host processor, a correct parity check enables AND gate 24 upon receipt of a write clock from the host processor which enables or strobes the write operation. The enabling of gate 24 enables gates 18 to pass the bits on line 10 into the appropriate locations in register 16. The input gates 12 are enabled by the input character counter which is included in the status word register 32 as bits 13 and 14. The receipt of three characters is enabled through input gates 12 via the signals IC1, IC2 and IC 3 generated by the input character counter upon being incremented by the output of AND gate 24 essentially in response to the write clock received from the host processor. The status word register also includes the output character counter, which generates the OC1, OC2 and OC3 signals during a read operation and which is incremented in essentially the same manner as was the input character counter. This shall be described with reference to the read operation, where data is read from the remote processor into the host processor. Thus, when a write opcode is received, this will means that the command decoded by decoder 30 is a write command and that this condition is set into the status word register 32. These just mentioned operations relate to blocks 11, 13 and 15 of FIG. 2. The forced read or write operation is described with reference to FIG. 4.

In response to the write signal on line 34, this signal is provided via OR gates 36 and 38 to enable one input of AND gate 40 whose other input is enabled by the Q output of flip-flop 42. Flip-flop 42 is set to enable such other input of AND gate 40 when the coupler is enabled to generate an interrupt in response to the receipt of an OCP 1535 instruction from opcode decoder 44 which is coupled to receive the various opcodes from the remote processor on bus 46. The full enabling of AND gate 40 causes an interrupt to be sent to the remote processor on line 48. In response to this interrupt, the remote processor will issue a request for the contents of the status word register 32 by means of the INA 1235 opcode which is received by AND gate 50 and thereby enables the contents of register 32 to be passed via lines 52 through AND gate 50 and OR gate 54 over bus 56 to the remote processor (block 19 of FIG. 2).

Upon receipt of the contents of the status word register 32, the command is analyzed as indicated by block 21 of FIG. 2, and the remote processor upon detecting a write operation command, loads the address at which such writing is to begin in the remote processor and the range allocated into the DMA address register 58 and the DMA range register 60. This is accomplished by the issuance by the remote processor respectfully of the OTA 1,435 and the OTA 1535 opcode commands thereby enabling respectively AND gates 62 and 64 to load the address and range sequentially from bus 66 as received from the remote processor. See blocks 23 and 25 of FIG. 2.

The next operation as indicated by block 27 is to enable both the remote processor and the coupler of the invention for direct memory access (DMA) operation. This is accomplished by issuance of the OCP 1435 command from the remote processor which operates to set flip-flop 68 thereby generating a DMA enable signal and a send character request to the host processor. The OCP 1,435 command also enables AND gate 70 during the read operation which shall be hereinafter discussed. Thus with a write operation as indicated by block 17, and with the send character request received by the host processor as indicated by block 29 of FIG. 2, the question is then whether or not all characters have been received by the input register 16 as indicated by block 31. If the answer is no, then another character request is sent to the host processor. If the answer to block 31 is yes, a transfer request is sent to the remote processor as indicated by block 33. The operations of blocks 31 and 33 are carried out by the apparatus of the invention in FIG. 1 when the input character counter of status word register 32 generates an IC3 signal thereby indicating that the third character has been received by input register 16. This causes flip-flop 72 to be set by means of OR gate 74. This then generates a transfer request to the remote processor. Once the transfer request has been received and honored by the remote processor, as indicated by block 35, the remote processor causes the MYADD command to be issued on bus 46 and decoded by decoder 44 so as to enable AND gate 74 via OR gate 76, thereby enabling the contents of the DMA register 58 to be passed through AND gate 74 and OR gate 54 over bus 56 to the remote processor. This is indicated by block 37. Block 39 indicates that the process of writing the data from the host processor via the coupler of the invention to the remote processor is finally accomplished by issuance by the remote processor of the MYDATA command which via OR gate 78 enables AND gate 80 to pass the contents of the input register 16 through AND gate 80 and OR gate 54 onto bus 56 and to the remote processor. The address as indicated by the DMA address register, indicates the location at which the word received over bus 56 in response to the MYDATA signal is to be stored. AND gate 82 is enabled in response to the write signal occurring thereon, which is one binary state of the direction of transfer (DT) bit on line 84, which in turn is one bit of the contents of DMA register output bus 86. In response to a write operation the DT bit is in a first binary state. Accordingly, when AND gate 82 is enabled, then AND gates 86 and 70 are not enabled.

Once the MYDATA signal is issued, and on the trailing edge thereof, the one-shot multivibrator 88 is enabled so as to reset the request for transfer flip-flop 72 thereby disabling the transfer request to the remote processor as indicated by block 41 of FIG. 2. If the DMA range register 60 is at the end of its previously loaded range, thereby generating the EOR signal, by means of the all zeros detector 90, then a terminate sequence command will be sent to the host processor as indicated by blocks 43 and 45 of FIG. 2. If the transfer is not complete, then block 47 will be entered whereby as indicated in FIG. 1, the $\overline{\text{EOR}}$ signal from the detector 90 will enable AND gate 92 thereby incrementing the address in register 58 and decrementing for example the remaining range in register 60. Since this is not the end of the range and accordingly there is more data to be sent, the DMA enable flip-flop 68 is again set thereby sending another character request to the host processor. Accordingly, block 47 is exited back into block 29 until a transfer complete is indicated by block 43. If the transfer is complete, as indicated by block 49 of FIG. 2, the host processor sends an end of operation signal to the coupler on line 94 thereby causing an interrupt to be sent on line 48 to the remote processor. In response to this interrupt, the remote processor may again issue an INA 1,235 command for purposes of inspecting the contents of the status word register.

Figure 3:
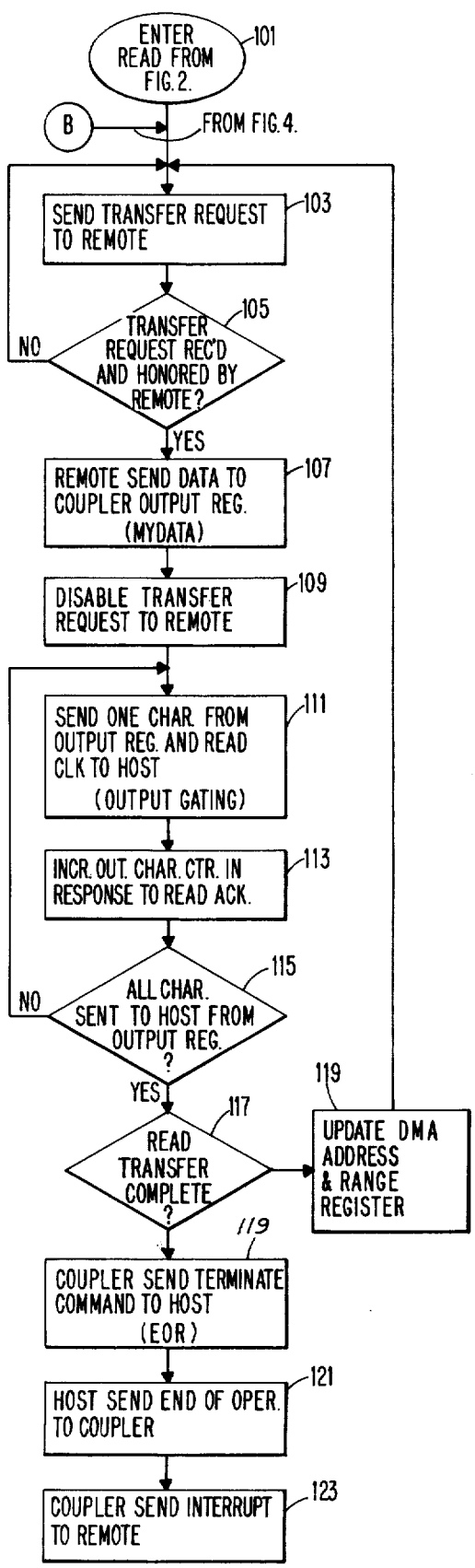
FIG. 3 is a flow diagram illustrating the normal read operation of the present invention.

Now referring to FIG. 3, the normal read operation shall be discussed. FIG. 3 is entered from block 17 of FIG. 2 if a read operation is indicated. As shall be seen, FIG. 3 is also entered from FIG. 4. Normally, such read operation is requested by the host processor in response to a read command request generated by the remote processor via an OCP 1335 opcode command which sets flip-flop 120 of FIG. 2. In response thereto, the host processor issues a read command and finally after the DMA registers are loaded and enabled, FIG. 3 is entered at block 101. Next there is sent a transfer request to the remote processor as indicated by block 103. In operation, this request is generated via flip-flop 72 via OR gate 74 in response to the read signal from the DT bit on line 84 in register 58 and in response to the OCP 1435 opcode command from the remote processor. If the transfer request has not been received and/or honored by the remote processor as indicated by block 105, block 103 is again entered. If such request is so received and honored, then block 107 is entered, wherein the remote processor then sends the character to the output register 102 via AND gate 122 which receives the 16 bits from bus 66 via the now enabled, by the read signal, AND gate 86 and the AND gate 122 which is in turn enabled by the MYDATA signal provided via opcode decoder 44 and OR gate 124.

On the trailing edge of the MYDATA signal, one-shot multivibrator 88 generates a pulse thereby resetting flip-flop 72 and disabling the transfer request to the remote processor as indicated by block 109. Further, flip-flop 126 is set thereby enabling the read clock signal to be sent to the host processor together with one character from output register 102 via output gates 9, over bus 100. At the same time, a parity signal may be provided to the host processor via well known parity generator circuit 128 which is coupled to the output of output gates 9. This operation is indicated by block 111. In response to the read clock, the host processor will send a read acknowledge signal on line 130 thereby incrementing the output counter thus in fact allowing such aforementioned operation of sending the character to the host processor and in addition incrementing the output character counter included in bits 11 and 12 of status word register 32, as indicated by block 113 of FIG. 3. This process is repeated until all three characters have been sent to the host processor, that is, until all signals OC1, OC2, and OC3 have been generated by the output character counter.

Thus, this process is repeated as shown by block 115 of FIG. 3 until by reentering block 111 all three characters have been transferred and finally when signal OC3 is generated, generating a yes condition and entering block 117. Block 117 is entered and asks whether or not the read transfer is complete. This is indicated as was the write operation by means of the contents of the DMA range register 60 and further by means of the detector 90 by the generation of the EOR signal. If the read transfer is not complete, then block 119 is entered and the DMA address register and the DMA range register are updated as was the case for the write operation and block 103 is reentered thereby generating another transfer request to the remote processor. This operation continues until block 119 is entered in response to a transfer complete condition, that is, when the EOR signal from all zeroes detector 90 is generated, at which time the coupler of the present invention sends a terminate command to the host processor, in response to which the host processor will send an end of operation signal to the coupler as indicated by block 121 of FIG. 3 thereby causing an interrupt to be sent to the remote processor over line 48, as indicated by block 123, of FIG. 3.

Figure 4:
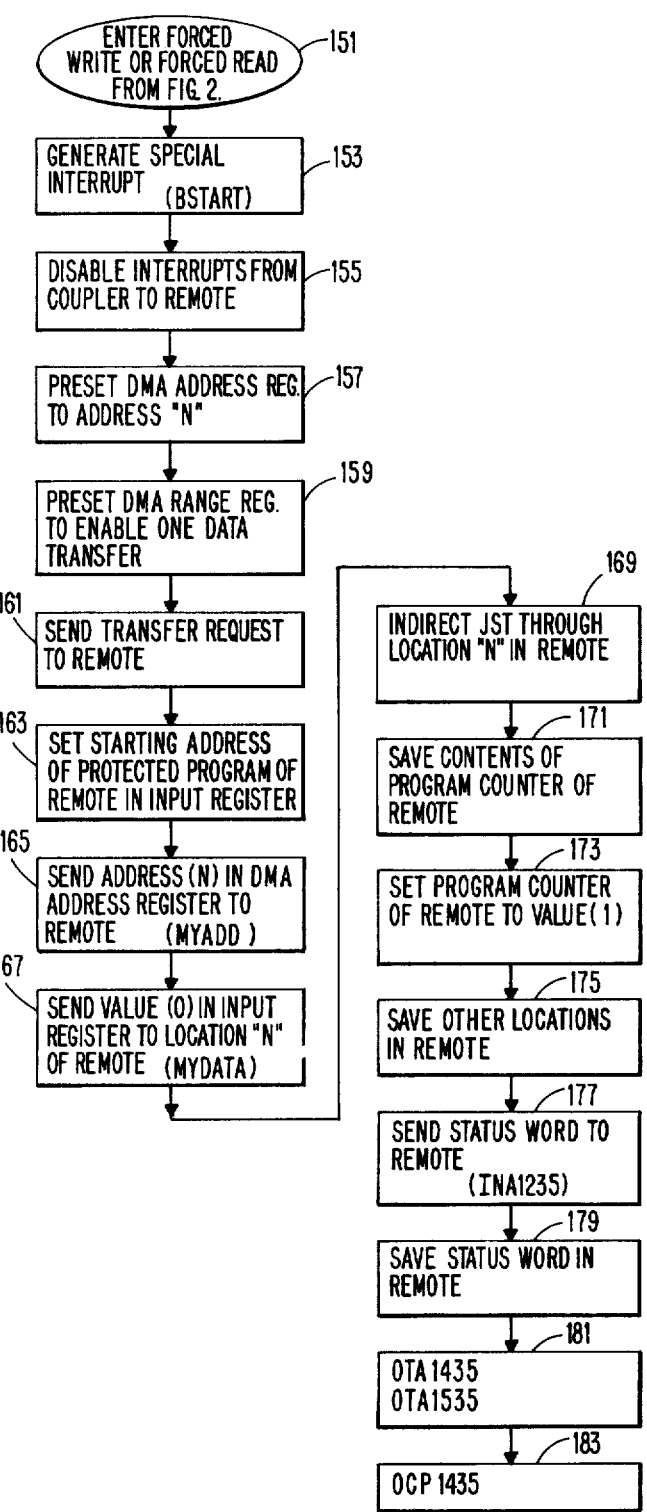
FIG. 4 is a flow diagram illustrating the forced write and forced read operations of the present invention.

Now referring to FIG. 4, and in addition the logic diagram of FIG. 1, the forced write and forced read operations shall be discussed. The normal sequence of events of FIG. 2 as indicated by blocks 11 and 13 are provided in operation until block 15 is entered and a forced write or forced read operation is indicated. This causes the operation to enter into the operation indicated by FIG. 4. Accordingly, a forced read or write signal will be provided by decoder 30 on line 150 thereby setting bit 7 of the status word register 32. This will fully enable either gate 152 or gate 154 depending on whether respectively a read operation is indicated or a write operation is indicated. In either case, a forced read or forced write operation as indicated at the output of such AND gates 152 or 154 generates a special interrupt signal via OR gate 156 which is referred to as the BSTART interrupt signal. In addition, and via OR gate 158, flip-flop 42 is reset thereby disabling normal interrupts via AND gate 40 and thereby disabling line 48 from providing interrupts to the remote processor. These operations are indicated by blocks 151, 153 and 155 of FIG. 4. The special BSTART interrupt signal also operates to place the remote processor in the running state if in fact it had been in the stop state. This is accomplished by well known automatic restart circuits which are usually employed in digital computers. Furthermore, in response to either the forced write or forced read signals, OR gate 170 is enabled to pass a signal to enable AND gates 172 and 174 so as to preset the DMA address register 58 with the value indicated by the value N in block 176 and so as to preset the DMA range register 60 to enable the occurrence of a single data transfer operation in the remote processor preparatory to accessing the remote processor's protected program as shall be hereinafter described. This single operation is indicated in block 178 of FIG. 1 and is enabled via AND gate 174 to the preset input of register 60. These operations are indicated by blocks 157 and 159 of FIG. 4.

In addition, the forced read or forced write signal is provided to set the request for transfer flip-flop 72 via OR gate 74 thereby sending a transfer request to the remote processor as indicated by block 161. In addition, input register 16 is reset to all zeroes in response to the signal received from OR gate 170. The input register 16 is reset to all zeroes to indicate the starting address of the protected program in the remote processor's memory which in this case is location zero. If the protected program did not start at location zero, then the input register 16 could then be loaded or preset with the value of the location at which the protected program begins. The operation of resetting such input register 16 is indicated by block 163 of FIG. 4.

In response to the special interrupt signal BSTART, the remote processor will then issue a MYADD opcode command thereby causing the contents of the DMA address register 58 to be transferred to the remote processor via gates 54, 74 and 76 over bus 56. Thus, the value N and therefore the location N in the remote processor's memory will be addressed and in response to the MYDATA command generated by the remote processor in response to the BSTART interrupt signal, the value in the input register, now preset to all zeroes, will be loaded into the address in the remote processor's memory whose location is N. This operation is indicated by blocks 165 and 167 of FIG. 4.

In response to the addressing of location N and the storing therein of the value zero, an indirect jump store (JST) instruction is provided in the remote processor through location N so that the protected program as indicated starting with block 171 of FIG. 4 is commenced. Thus, after block 169, of FIG. 4, block 171 is entered and the protected program in the remote processor's memory, effectively starting at location zero (actually location zero plus one) is provided for operation.

After saving the contents of the program counter in location zero of the remote processor as indicated by block 171, the program counter is incremented by the remote processor and set to point to location one, location one being the beginning of the protected program, as indicated by block 173. After this block 175 is entered whereby the remote processor saves the contents of other locations such as the registers included in the accumulator or arithmetic unit of the remote processor. The protected program then issues the INA 1,235 opcode command so as to obtain the contents of the status word in register 32. After this operation is performed as indicated by block 177 of FIG. 4, the status word is stored in another location in the remote processor's memory as indicated by block 179. After this, the protected program issues the OTA 1435 and OTA 1,535 commands as indicated in block 181 so as to load registers 58 and 60 with the respective address and range of the data which is to be transferred. After this, and as indicated by block 183 of FIG. 4, the remote processor's protected program issues the OCP 1435 command so as to enable the DMA transfer and as indicated by the final block 185 of FIG. 4, the forced read or forced write command is detected thereby enabling either the operation beginning at A in FIG. 2 for the forced write operation or the operation beginning at B in FIG. 3 for the forced read operation. Thus in this manner, the forced read or forced write operation is performed even though the system software is disabled in the remote processor by providing the protected program in the remote processor so as to enable the DMA range and address registers and other conditions so as to then provide for the transfer of data as indicated for the read operation depicted in FIG. 2 and the write operation as depicted in FIG. 3.

Figure 5:
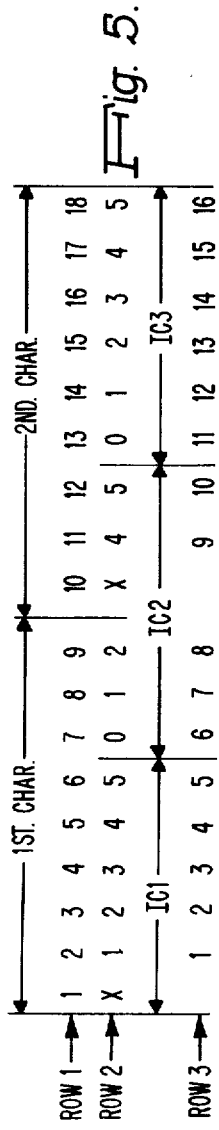
FIG. 5 illustrates the input gating state diagram.

Now referring to FIG. 5, there is shown a representation of the manner in which a word of one size as utilized in the host processor is converted into a word of another size usable by the remote processor. By the illustration, the host processor normally operates with 36 bit words comprised of four characters, whereas the remote processor operates with 16 bit words. FIG. 5 for ease of illustration, illustrates only the first 18 bits and accordingly the first and second characters. The second eighteen bits and accordingly the third and fourth characters are handled in the same manner as shall be presently discussed for the first and second characters. The thirty-six bit word is transferred to the coupler 6 bits at a time and from the coupler to the remote processor sixteen bits at a time. The first character of the host processor includes bits one through nine whereas the second character includes bits ten through eighteen. Since typically the first bit of each character, namely bits one and ten do not contain data and may include for example a parity bit, they may be dropped and accordingly not used. This is indicated by the X in the second row of FIG. 5. The numbers zero through five in the second row of FIG. 5 indicate the 6 bit lines of the bus 10. Accordingly as can be seen, during the first character time, that is, IC1, as indicated by the input character counter of register 32, bit two of the first character received from the host processor is transmitted to the input register on line one, whereas bit three is transmitted on line two and further until bit six is transmitted on line five. During character time two (IC2), bit seven of the first character is transmitted on line zero, bit eight on line one, bit nine on line two, bit ten is not used, bit eleven is transmitted on line four, and bit twelve is transmitted on line five. During character time three (IC3) bits 13 through 18 of the second character are transmitted to the input register 16 on lines zero through five. This is translated as seen in the third row into sixteen bits to be received by the remote processor via bus 56 as indicated by the numbers one through sixteen.

Figure 6:
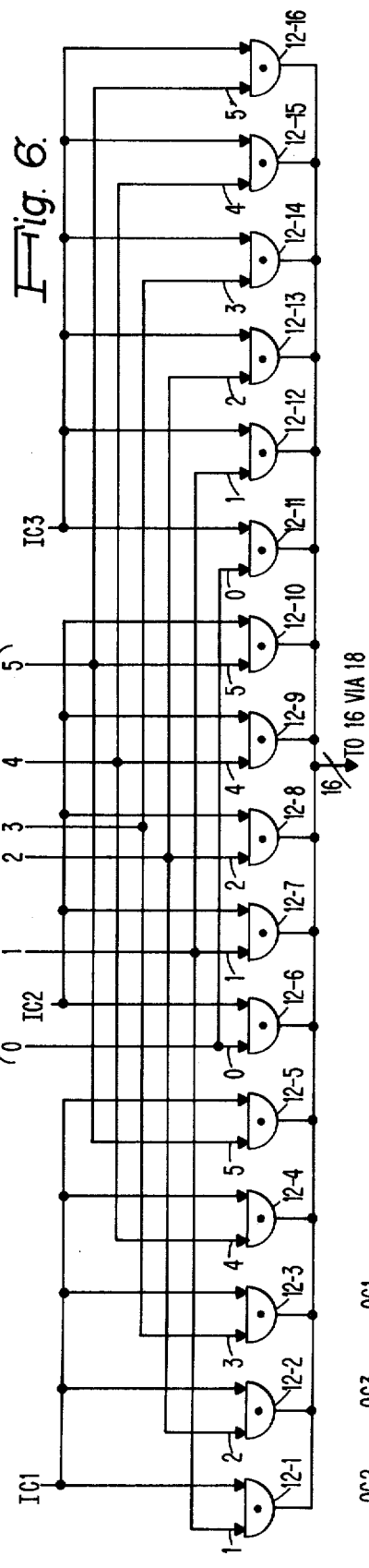
FIG. 6 illustrates a logic diagram of the input gating of the coupler of the present invention.

This arrangement may be provided in logic gates 12 as shown in FIG. 6. FIG. 6 illustrates sixteen AND gates 12-1 through 12-16 which are included in input gates 12. Signal IC1 is utilized to enable gates 12-1 through 12-5, the signal IC2 is utilized to enable gates 12-6 through 12-10 and the signal IC3 is utilized to enable gates 12-11 through 12-16. The numbered gates, that is 12-1 through 12-16 may be compared one for one with the numbers indicated in the third row of FIG. 5. Accordingly, the inputs to the respective gates of FIG. 6 correspond to the second numbered row of FIG. 5. Thus, gate 12-1 is coupled to receive line 1, gate 12-2 is coupled to receive line 2, etc. until gate 12-5 is coupled to receive line 5. Gate 12-6 is coupled to receive line zero and so on until gate 12-10 is coupled to receive line 5. Similarly, gates 12-11 through 12-16 are coupled to receive lines zero through five of bus 10.

Figure 7:
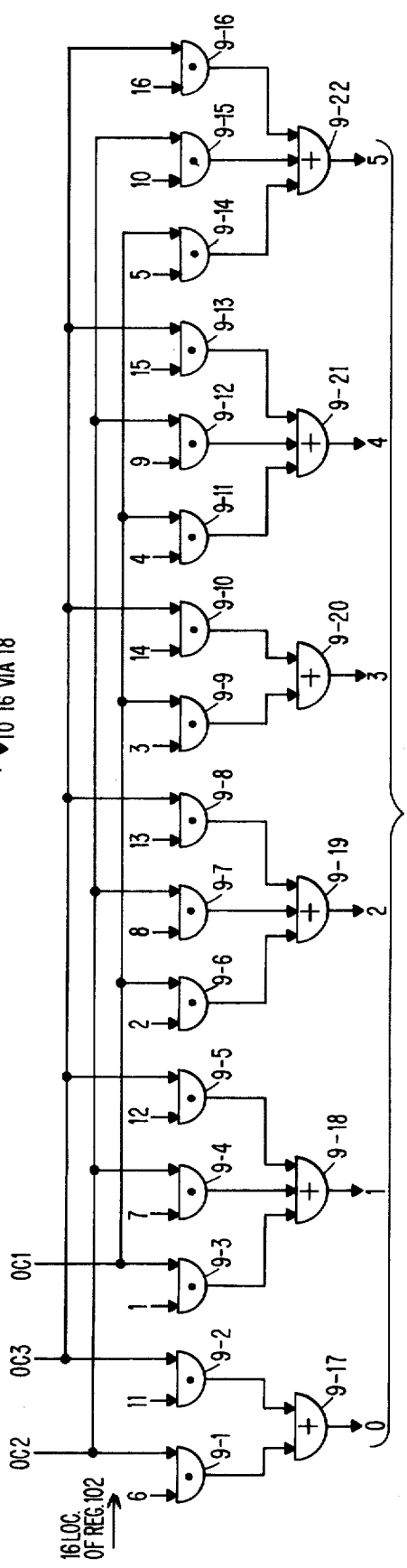
FIG. 7 illustrates a logic diagram of the output gating of the coupler of the present invention.

Now referring to the output gating of FIG. 7, there is shown 16 gates 9-1 through 9-16 which are included in output gates 9 of FIG. 1. These gates are coupled to receive respectively the outputs of the output character counter included in register 32 and in addition the 16 bit locations of output register 102. These AND gates are respectively coupled to OR gates 9-17 through 9-22 also included in output gates 9. The outputs of these six OR gates are coupled to bus 100 as the six lines of bus 100 in FIG. 1. The state diagram of FIG. 6 for the write operation may be utilized in explaining the read operation as provided by the logic of FIG. 7. In essence, the numbered inputs of row 3 correspond to the inputs of AND gates 9-1 through 9-16. The outputs of OR gates 9-17 through 9-22 correspond to the numbers of row 2 of FIG. 6. For purposes of the read operation, the terms IC1 through IC3 should be replaced by respectively OC1 through OC3. Thus, when signal OC1 is generated, bit location 1 will be presented on line 1, whereas when signal OC2 is generated, bit location 7 of output register 102 will be presented on line 1. Likewise, when signal OC3 is present, bit location 12 of register 102 will be presented on line 1. In a like manner, the other bits responsive to the generation of the OC1 signal as well as the other signals of the output character counter enable the respective bit locations of register 102 to be placed on the six lines of bus 100 via OR gates 9-17 through 9-22. Thus, in further illustration of the operation of the logic of FIG. 7, when the signal OC2 is present, the contents of bit location 9 of register 102 is placed on line 4 via AND gate 9-12 and OR gate 9-21. Further, when signal OC3 is present, for example, the contents of bit location 11 of register 102 are passed through AND gate 9-2 and OR gate 9-17 and is placed on line zero of bus 100 and sent to the host processor.

Having described the invention, what is claimed as new and novel and desired to be secured by Letters Patent is:

1. A system for providing bidirectional data transfer between a host processor and a remote processor, wherein said host processor is configured to process words of a first length and wherein said remote processor is configured to process words of a second length, said system including a coupler for interfacing said processors, said coupler comprising:

A. means for detecting any one of a plurality of data transfer commands from said host processor, said data transfer commands including read and write data transfer commands;

B. an input register coupled for receiving data from said host processor;

C. an output register coupled for receiving data from said remote processor;

D. first means for transferring data from said input register to said remote processor;

E. second means for transferring data from said output register to said host processor;

F. means for enabling said first and second means for transferring for the transfer of data from either said input or output registers to respectively said remote and host processors in response to either said write or read commands respectively;

G. status word register means comprising a plurality of bit locations, some of said locations for indicating whether a read or write data transfer command has been detected, said register means further including
1. an input counter, and
2. an output counter;

H. first means for changing the value of said input counter in response to a transfer of a subportion of a said word of said first length from said host processor to said input register;

I. second means for changing the value of said output counter in response to a transfer of a subportion of a said word of said second length from said output register to said host processor;

J. conversion means responsive to said input and output counter, including:
1. first means for providing a conversion of a said word of said first length to a said word of said second length, and
2. second means for providing a conversion of a said word of said second length to a said word of said first length; and 2. A system as in claim 1 wherein said first means for providing included in said conversion means comprises:
A. a plurality of logic gates;
B. means, responsive to said input counter, for enabling a plurality of said gates equal in number to the number of bits in said subportion of said words for transfer of a said subportion of a said word to said input register; and
C. means, responsive to said input counter, for enabling different said pluralities of said gates until all subportions of a said word are included in said input register.

3. A system as in claim 1 wherein said second means for providing included in said conversion means comprises:
A. a plurality of logic gates;
B. means, responsive to said output counter, for enabling a plurality of gates equal in number to the number of bits in said subportion of said words for transfer of a said subportion of a said word to said host processor; and C. means, responsive to said output counter, for enabling different said pluralities of said gates until all subportions of a said word are transferred to said host processor.

4. A system as in claim 1 further comprising means, including an address register and a range register, for indicating the starting address in a memory included in said remote processor and the range of addresses starting from said starting address to or from which said data is to be transferred with said input or output registers.

5. A system as in claim 4 further comprising:
A. means for transferring the contents of said status word register means to said remote processor; and
B. means, responsive to the contents of said status word register means, for loading the contents of said address register and said range register.

6. A system as in claim 4 wherein said data transfer commands include a forced read command and a forced write command and further comprising means for enabling a forced transfer of data from either said input or output registers to respectively said remote and host processors in response to a predetermined condition, said means for enabling said forced transfer comprising:
A. means for generating a special interrupt signal in response to the detection of either a said forced read or forced write data transfer command;
B. means, responsive to said interrupt signal, for presetting said address register to an address of a predetermined location in said remote processor's memory from which said remote processor may initiate a forced data transfer sequence;
C. means, responsive to said interrupt signal, for presetting said range register to an initial value indicative of at least one predetermined operation;
D. means for transferring said address of said predetermined location and said initial value to said remote processor;
E. means, responsive to said interrupt signal, for presetting said input register with an initial address of a predetermined group of locations in said remote processor's memory, said group of locations including a plurality of commands for enabling said forced data transfer sequence;
F. means, responsive to the processing of said at least one predetermined operation, for providing said initial address to said remote processor; and
G. means, responsive to said plurality of commands, for enabling said data transfers even though the normal means for providing such data transfers in said remote processor is unuseable.

7. A system as in claim 6 wherein said means for forcing said transfer of data further comprises means, responsive to said interrupt signal, for disabling any further interrupt signals from being received by said remote processor.

* * * * *

UNITED STATES PATENT OFFICE
CERTIFICATE OF CORRECTION

PATENT NO. : 3,976,979
DATED : August 24, 1976
INVENTOR(S) : Kelvin L. Parkinson et al It is certified that error appears in the above—identified patent and that said Letters Patent are hereby corrected as shown below:

Column 11, line 36, after "; and" begin a new line and insert --3. wherein said words of said first and said second lengths each include different respective first pluralities of bits and wherein said subportions of said words include different respective second pluralities of bits, the number of said respective second plurality of bits being less than the number of said respective first plurality of bits.--.

Signed and Sealed this

First Day of February 1977

[SEAL]

Attest:

RUTH C. MASON
*Attesting Officer*

C. MARSHALL DANN
*Commissioner of Patents and Trademarks*